US010778754B2

(12) United States Patent
Capello et al.

(10) Patent No.: US 10,778,754 B2
(45) Date of Patent: Sep. 15, 2020

(54) SUBSCRIBER SESSION RE-DISTRIBUTION IN A COMMUNICATION NETWORK

(71) Applicant: Telecom Italia S.p.A., Milan (IT)

(72) Inventors: Alessandro Capello, Turin (IT); Diego Daino, Turin (IT)

(73) Assignee: Telecom Italia S.p.A., Milan (IT)

( * ) Notice: Subject to any disclaimer, the term of this patent is extended or adjusted under 35 U.S.C. 154(b) by 307 days.

(21) Appl. No.: 15/567,424

(22) PCT Filed: May 5, 2015

(86) PCT No.: PCT/EP2015/059794
§ 371 (c)(1),
(2) Date: Oct. 18, 2017

(87) PCT Pub. No.: WO2016/177400
PCT Pub. Date: Nov. 10, 2016

(65) Prior Publication Data
US 2018/0109604 A1    Apr. 19, 2018

(51) Int. Cl.
*G06F 15/177* (2006.01)
*H04L 29/08* (2006.01)
*H04L 12/24* (2006.01)
*H04L 12/26* (2006.01)

(52) U.S. Cl.
CPC ...... *H04L 67/1008* (2013.01); *H04L 41/0816* (2013.01); *H04L 43/16* (2013.01); *H04L 67/1002* (2013.01); *H04L 67/148* (2013.01); *H04L 67/16* (2013.01); *H04L 41/0672* (2013.01); *H04L 41/0893* (2013.01)

(58) Field of Classification Search
CPC .. H04L 67/1008; H04L 41/0816; H04L 43/16
USPC .................................................. 709/203, 221
See application file for complete search history.

(56) References Cited

U.S. PATENT DOCUMENTS

| 7,487,243 B1 | 2/2009 | Zielinski et al. |
| 2005/0080890 A1* | 4/2005 | Yang ............ H04L 69/22 709/223 |
| 2006/0187838 A1 | 8/2006 | Alex et al. |
| 2008/0186982 A1* | 8/2008 | Chang ............ H04L 47/10 370/400 |

(Continued)

OTHER PUBLICATIONS

International Search Report dated Dec. 12, 2015, in PCT/EP2015/059794 filed May 5, 2015.

*Primary Examiner* — Duyen M Doan
(74) *Attorney, Agent, or Firm* — Oblon, McClelland, Maier & Neustadt, L.L.P.

(57) ABSTRACT

It is disclosed a method for re-distributing subscriber sessions originated from one or more access nodes of a communication network to a number of service nodes of the communication network. The method comprises: monitoring at least one performance parameter of the service nodes; comparing a value of the at least one performance parameter with a threshold; and, in case the value exceeds the threshold at a given service node, determining a number of subscriber sessions to be moved from the given service node; selecting at least one further service node to re-establish the number of subscriber sessions; and re-configuring the communication network to move the number of subscriber sessions from the given service node to the at least one further service node.

15 Claims, 3 Drawing Sheets

(56) References Cited

U.S. PATENT DOCUMENTS

| | | | | |
|---|---|---|---|---|
| 2013/0167047 A1* | 6/2013 | Pujari | ............. | G06F 3/048 |
| | | | | 715/762 |
| 2013/0290513 A1* | 10/2013 | Shikari | ............. | H04L 43/08 |
| | | | | 709/224 |
| 2014/0344337 A1* | 11/2014 | Sramka | ............. | H04L 67/10 |
| | | | | 709/203 |

* cited by examiner

SUBSCRIBER SESSION RE-DISTRIBUTION IN A COMMUNICATION NETWORK

TECHNICAL FIELD

The present invention relates to the field of communication networks. In particular, the present invention relates to a method for re-distributing subscriber sessions to a number of service nodes of a broadband communication network.

BACKGROUND ART

In a broadband communication network, such as an Internet protocol (IP) network, a subscriber connects to the network by establishing a subscriber session between a subscriber's device and the network. Examples of a subscriber's device are a computer, a modem, a portable digital assistance (PDA) device, a tablet, a mobile phone, a smartphone, and the like.

As known, the point-to-point (PPP) protocol is a network communication protocol of the data link layer of the ISO-OSI model which may be used for establishing a subscriber session. Moreover, the dynamic host configuration protocol (DHCP) is typically used on IP networks for dynamically distributing network configuration parameters, such as IP addresses, to subscriber's devices requesting to access the network.

Typically, a subscriber session is established between the subscriber's device at the customer premise and a service node belonging to the network, which routes the traffic to and from the subscriber on the broadband communication network. For instance, the service node may be a provider edge (PE) node or a broadband remote access server (BRAS) managed by the network operator. A broadband communication network may include a plurality of service nodes. The subscriber's line is physically connected to an access node such as, for instance, a digital subscriber line access multiplexer (DSLAM) or an optical line termination (OLT), managed by the network operator, which is situated at an intermediate position between the subscriber's device and the service node. Typically, a plurality of subscribers are connected to the same access node that in turn may connect to one or more service nodes. The access nodes and the service nodes are connected by means of an aggregation network, which is usually an Ethernet network or an IP/multi-protocol label switching (MPLS) network.

The assignment of the subscriber sessions of an access node to the one or more services nodes of the communication network is usually static and performed during the network provisioning phase.

US 2008/0186982 discloses a system that includes a plurality of aggregation nodes. Each aggregation node is configured to generate a node utilization data. A pool master is configured to generate a node utilization list responsive to the node utilization data received from each aggregation node and to activate the plurality of aggregation nodes responsive to the node utilization list.

U.S. Pat. No. 7,487,243 discloses a network device that includes a tunneling module that load balances subscriber sessions across a plurality of tunnel termination devices based on weightings associated with the tunnel termination devices. The weightings may be assigned to the tunnel termination devices by a user, or may be calculated by the network device based on resource constraints associated with the tunnel termination devices. The network device may calculate the weightings, for example, based on a maximum number of subscriber sessions supported by each of the tunnel termination devices. As one example, the techniques may be applied to load balance point-to-point (PPP) subscriber sessions across L2TP network servers (LNSs).

SUMMARY OF THE INVENTION

A service node typically performs a number of operations on subscriber sessions, such as, for instance, subscriber identification, authentication, accounting, application of quality of service (QoS) policies. These operations impact on the service node in terms of performances and processing requirements, in particular they impact on the central processing unit (CPU) utilization and memory utilization of the service node. It follows that a high number of sessions terminated on the same service node may compromise the performance of the node itself and lead to malfunction or even to service unavailability. Indeed, an overload of the computing resources of the service node may cause the closing of some subscriber sessions. In this case, the subscriber's device experiencing the closing of a session typically tries to re-establish it but this operation makes the service node overload condition even worse.

The inventors noticed that, according to US 2008/0186982, the aggregation nodes are listed in a node utilization list on the basis of node utilization data which is expressed as the ratio of the number of subscribers connected to the node and the maximum number of subscriber sessions that the node may maintain. The aggregation nodes within the list become "active" one by one and at any given time only the currently active aggregation node may accept new subscriber sessions.

The inventors further noticed that the method of US 2008/0186982 is not optimal in terms of time of establishment of new subscriber sessions, especially in case of fault scenarios where it is necessary to limit the out of service time. Indeed, in case an aggregation node experiences a fault, the sessions that it is maintaining are interrupted. In turn, the subscribers' devices experiencing such service interruption probably would try to re-establish their sessions. Therefore, the currently active aggregation node starts accepting these sessions as well as new sessions not experiencing the fault condition. This may cause traffic congestion on the interfaces of the active aggregation node, which leads to delay and worsening of the quality of experience (QoE) perceived by the subscribers.

Moreover, the inventors noticed that the load balancing technique described in U.S. Pat. No. 7,487,243 is based on a static scheme for distributing subscriber sessions across tunnel termination devices, such scheme being related to preference levels and weightings. Indeed, U.S. Pat. No. 7,487,243 does not disclose how the system may react to intervening changes in the conditions of the network, which may have an impact on the provisioning of the subscriber sessions. Changing conditions may relate to traffic overloads, network faults, and the like, which may lead to interruption of established subscriber sessions and/or service unavailability. The scheme described in U.S. Pat. No. 7,487,243 keeps the session distribution across the tunnel termination devices the same during time and it is not applicable to dynamically react to changing conditions within the network.

In view of the above, the Applicant has tackled the problem of providing a method for re-distributing subscriber sessions in a communication network which overcomes the aforesaid drawbacks.

In particular, the Applicant has tackled the problem of providing a method for re-distributing subscriber sessions in a communication network which allows preventing overload conditions on a service node and allows reacting to changing conditions within the network which would impact on the subscriber sessions provisioning.

The Applicant has solved this problem by providing a method for re-distributing subscriber sessions in a communication network that allows dynamically changing the association between an access node and a service node for carrying subscriber sessions, in case the service node is experiencing critical load conditions. In this way, the subscriber sessions accessing the network through an access node are not impacted by such critical load conditions. The method is applicable both during the normal operation of the communication network, to control resource consumption of the service nodes, and in case of an intervening change in the network normal operative conditions, such as a fault, which may overload a service node. Specifically, the method provides for monitoring a number of parameters indicating the stability of the service nodes and, on the basis of these parameters, changing the association between an access node and a service node when one or more of these parameters exceed a predefined threshold. The method further provides for automatically re-configuring the nodes of the communication network in order to support the change of access node/service node association.

The "stability" of a service node is related to its resource availability, as it will be defined in more detail herein after.

In the present description and in the claims:
- the term "session" will indicate a logical construct which represents a network connectivity service instance at a network node;
- the expression "subscriber session" will indicate a logical construct intended to represent, in the context of network connectivity service at a network node, all traffic associated with that subscriber in order to provide a context for data and control plane policy enforcement. Subscriber Sessions are initiated and configured dynamically or statically and may have associated state. Examples of subscriber sessions are a PPP session, an IP session, or an Ethernet session;
- the expression "access node" will indicate a node which processes subscribers' frames or packets at Layer 2 or above of the known ISO-OSI protocol stack. An access node may be, but is not limited to, a DSLAM or an OLT (in case of (G)PON networks);
- the expression "aggregation node" will indicate a node which aggregates several access nodes; and
- the expression "service node" will indicate a node that is used to create services for subscribers and is connected to one or more aggregation nodes. Examples of service nodes include provider edge (PE) nodes, broadband remote access servers (BRAS), and broadband network gateways (BNGs).

According to a first aspect, the present invention provides a method for re-distributing subscriber sessions originated from one or more access nodes of a communication network to a number of service nodes of the communication network, the method comprising:
a) monitoring at least one performance parameter of the service nodes;
b) comparing a value of the at least one performance parameter with a threshold; and
in case the value exceeds the threshold at a given service node,
c) determining a number of subscriber sessions to be moved from the given service node;
d) selecting at least one further service node to re-establish the number of subscriber sessions; and
e) re-configuring the communication network to move the number of subscriber sessions from the given service node to the at least one further service node.

Preferably, the at least one performance parameter is indicative of one or more of the following: CPU utilization, memory utilization, number of active subscriber sessions, available bandwidth on each service node interface, presence of alarms.

According to an embodiment of the present invention, the at least one performance parameter is indicative of a ratio, R, between a number, NS, of active subscriber sessions at the given service node and a maximum number of subscriber sessions, NSmax, that the given service node may maintain.

According to other embodiments, the at least one performance parameter comprises a first parameter indicative of a ratio between a number of active subscriber sessions at the given service node and a maximum number of subscriber sessions that the given service node may maintain, a second parameter indicative of a CPU utilization of the given service node and a third parameter indicative of a memory utilization of the given service node.

Preferably, the method further comprises compiling a list comprising the service nodes and, for each of them, one or more data related to the at least one performance parameter of the service node.

Preferably, the number of subscriber sessions to be moved from the given service node is equal to at least an amount of subscriber sessions whose removal from the given service node would bring the value of the at least one performance parameter exceeding the threshold below the corresponding threshold.

Preferably, the number of subscriber sessions to be moved from the given service node is greater than said amount of subscriber sessions.

Preferably, the number of subscriber sessions to be moved from the given service node is equal to or greater than $(R-T) \cdot NSmax$, T being the threshold.

Preferably, the method further comprises, before step d), identifying a minimum number of access nodes from which the subscriber sessions to be moved from the given service node come from.

Preferably, the minimum number of access nodes is selected such that a sum of active subscriber sessions established between the given service node and the minimum number of access nodes is greater than the number of subscriber sessions to be moved from the given service node.

Preferably, selecting at least one further service node comprises selecting a plurality of further service nodes.

Preferably, the at least one further service node is selected as the further service node that is currently associated with a minimum number of active subscriber sessions.

Preferably, the access nodes and the service nodes are interconnected through a seamless MPLS network.

According to a second aspect, the present invention provides a computer program product comprising computer-executable instructions for performing, when the program is run on a computer, the steps of the method as set forth above.

According to a third aspect, the present invention provides an apparatus for re-distributing subscriber sessions originated from one or more access nodes of a communication network to a number of service nodes the communication network, the apparatus being configured to:

monitor at least one performance parameter of the service nodes;

compare a value of the at least one performance parameter with a threshold; and in case the value exceeds the threshold at a given service node, determine a number of subscriber sessions to be moved from the given service node;

select at least one further service node to re-establish the number of subscriber sessions; and re-configure the communication network to move the number of subscriber sessions from the given service node to the at least one further service node.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

Figure 1:
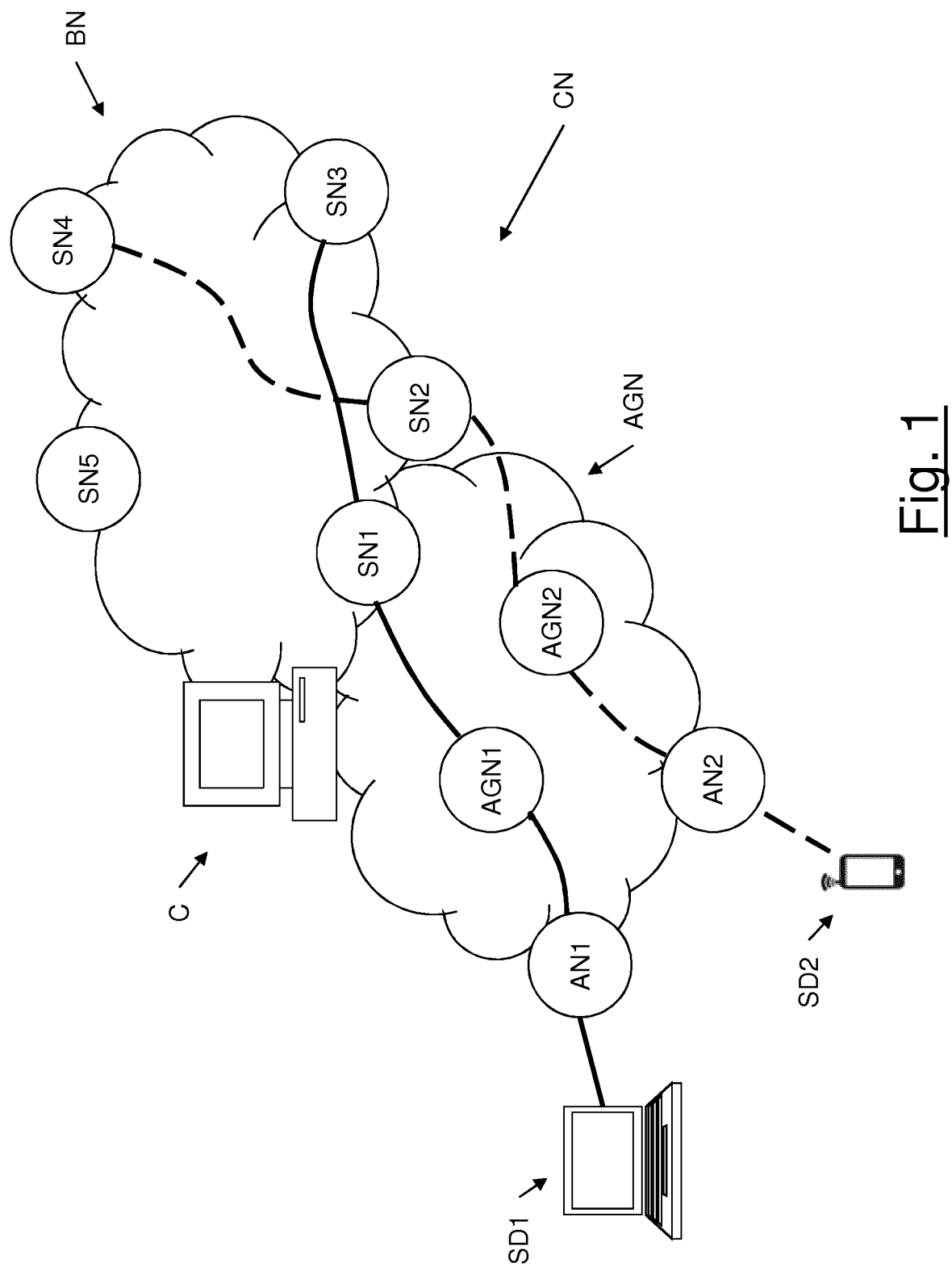
FIG. 1 schematically shows a communication network suitable for implementing the method of the present invention.

FIG. 1 schematically shows a communication network CN suitable for implementing the method according to the present invention. Preferably, the communication network CN comprises an aggregation network AGN and a backbone network BN. Preferably, the aggregation network AGN is one of: an Ethernet network, an IP network, an MPLS network. Preferably, the backbone network BN is an Internet Protocol (IP) communication network.

The communication network CN is preferably configured to provide access to broadband services provided by a service provider to a number of subscribers. It is assumed for sake of example that each subscriber connects to the network CN from its premises by means of one or more subscriber's devices, such as a computer, a modem, a portable digital assistance (PDA) device, a tablet, a mobile phone, a smartphone, and the like. FIG. 1 schematically shows a first subscriber device SD1 and a second subscriber device SD2 by means of which one or more subscribers may access the communication network CN.

The communication network CN preferably comprises a number of access nodes. For sake of example, FIG. 1 shows a first access node AN1 and a second access node AN2. Each access node AN1, AN2 is preferably connected to one or more subscriber's devices, either through a wired connection or a wireless connection. In this way, each access node AN1, AN2 is preferably configured to provide access to the communication network CN to the subscriber's devices SD1, SD2. For sake of example, in FIG. 1 the first subscriber device SD1 is connected to the first access node AN1 by means of a wired connection, and the second subscriber device SD2 is connected to the second access node AN2 by means of a wireless connection. Moreover, each access node AN1, AN2 is preferably connected to the aggregation network AGN.

Each access node AN1, AN2 may be for instance a digital subscriber line access multiplexer (DSLAM), an optical line termination (OLT), or the like.

The aggregation network AGN preferably comprises a number of aggregation nodes. For sake of example, in FIG. 1 the aggregation network AGN comprises a first aggregation node AGN1 and a second aggregation node AGN2. Each aggregation node AGN1, AGN2 is preferably configured to aggregate subscribers' data traffic from one or more access nodes AN1, AN2 and to forward the subscribers' data traffic to one or more nodes of the backbone network BN.

The backbone network BN preferably comprises a number of service nodes. For sake of example, in FIG. 1 the backbone network BN comprises five service nodes SN1-SN5, a first service node SN1, a second service node SN2, a third service node SN3, a fourth service node SN4 and a fifth service node SN5. Each service node SN1-SN5 may be for instance a provider edge (PE) node or a broadband remote access server (BRAS). Each service node SN1-SN5 preferably comprises a central processing unit (CPU), a memory and one or more interfaces towards the aggregation nodes AGN1, AGN2 on one side and other nodes of the network CN (not shown in the Figures) on the other side.

The communication network CN is configured to support subscriber sessions established between the subscriber devices SD1, SD2 and the service nodes SN1-SN5 of the backbone network BN. As already defined above, a subscriber session represents a connection between a subscriber device and a service node through which the subscriber device accesses the services provided by the service provider.

According to the present invention, the communication network CN preferably comprises a controller C. The controller C may be implemented via software, via hardware or a combination of hardware and software. In particular, the controller C may be a stand alone device, such as, e.g., a server, or it may be a virtualized device implemented over a virtual machine running on a device. In these cases, the controller C is preferably configured to run a dedicated software for performing the method of the present invention, as it will be described in detail herein after. Moreover, the controller C may be in the form of a software running over a stand-alone device or over a node of the communication network CN. In particular, the controller C may be implemented as a software running over either an aggregation node AGN1, AGN2 or a service node SN1-SN5, the software being configured to implement the method according to the present invention.

The controller C preferably comprises a map of the communication network CN. The map may comprise information identifying the links connecting the nodes of the communication networks. The map may further comprise information identifying the node interfaces, comprising, for instance, for each interface, the interface type (e.g. IP, Ethernet, etc.), the interface address and other information allowing to represent the connectivity implemented within the communication network CN. The information comprised within the network map may change over time depending on changes in the network topology due to, e.g. link interruptions or deployment of new links or new nodes.

According to an embodiment of the present invention, the communication network CN comprises a backup controller (not shown in the drawings) which is configured to intervene in case of failure or malfunction of the controller C.

The controller C is preferably connected to all the nodes of the communication network CN, namely the access nodes AN1, AN2, the aggregation nodes AGN1, AGN2, and the service nodes SN1-CN5. The connection between the controller C and a node may be a direct (either wired or wireless) connection. A node may also be connected to the controller C through other intermediate nodes.

It is assumed that, under normal operation of the communication network CN, a static association between the access nodes AN1, AN2 and the service nodes SN1-SN5 is performed allowing the subscribers' devices to access the subscribed services. For example, such association may be performed on the basis of the geographical location of a subscriber. In this exemplary scenario, a number of subscribers located within a same geographical area and served by one or more access nodes may be associated with the service node that is located in the closest proximity of that area.

It is assumed, in the following description, for sake of non limiting example, that a number of subscriber sessions are established between the subscriber devices SD1, SD2 and the service nodes SN1-SN5, for instance according to the PPP protocol and/or the DHCP protocol mentioned above. These sessions will be referred to in the following as "active subscriber sessions". As represented in FIG. 1, it is assumed that a first subscriber session is established between the first subscriber device SD1 and the third service node SN3 and that a second subscriber session is established between the second subscriber device SD2 and the fourth service node SN4. The path of the first subscriber session within the communication network CN is represented in FIG. 1 by means of a solid line connecting the first subscriber device SD1 and the third service node SN3. The path of the first subscriber session comprises the first access node AN1, the first aggregation node AGN1, the first service node SN1 and the third service node SN3. The path of the second subscriber session within the communication network CN is represented in FIG. 1 by means of a dashed lines connecting the second subscriber device SD2 and the fourth service node SN4. The path of the second subscriber session comprises the second access node AN2, the second aggregation node AGN2, the second service node SN2 and the fourth service node SN4.

Figure 2:
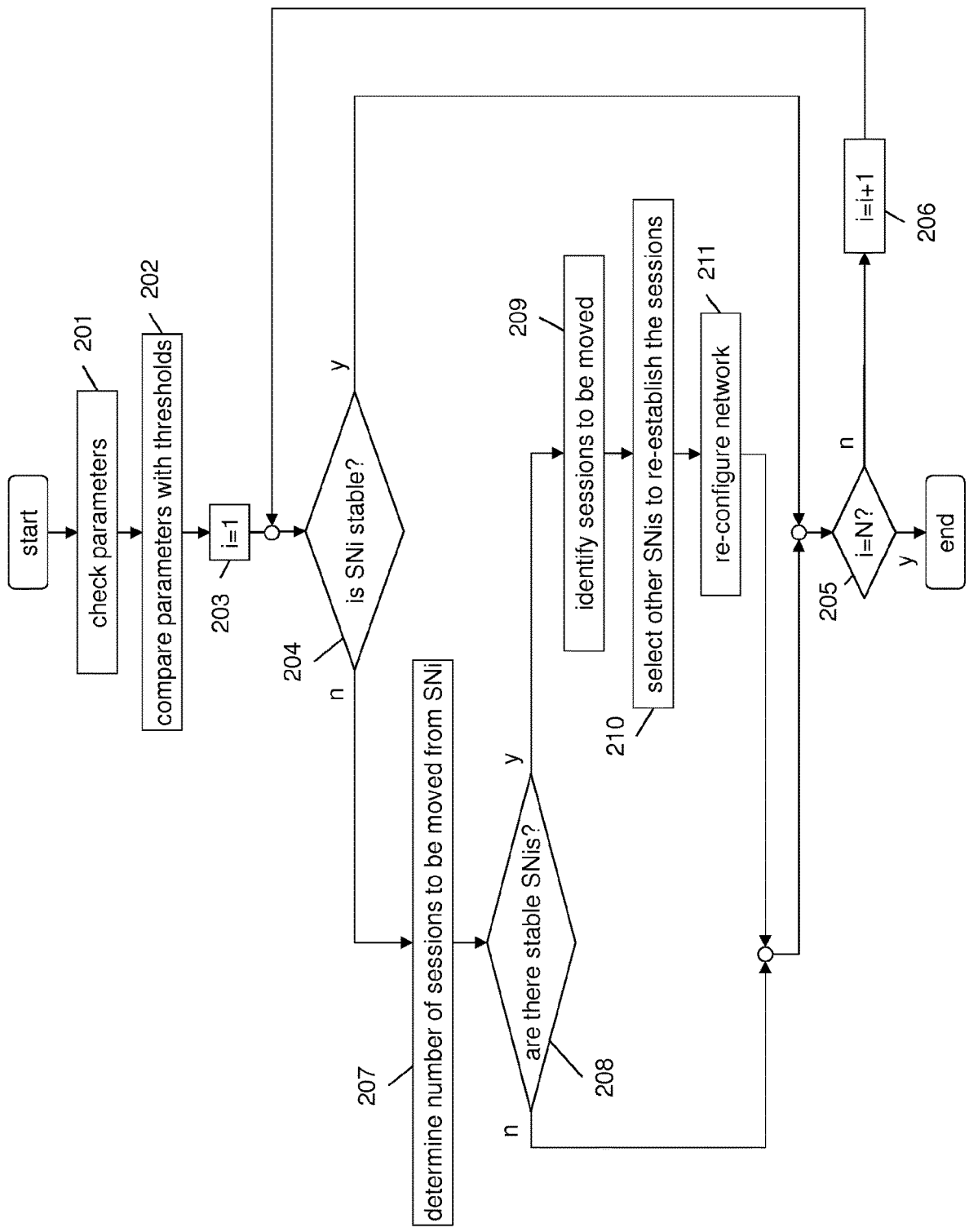
FIG. 2 is a flow chart of the method according to the present invention.

FIG. 2 is a flow chart illustrating the steps of the method according to the present invention. The steps of the flow chart of FIG. 2 are preferably performed by the controller C.

At step 201, the controller C preferably send a request to each service node SN1-SN5 in order to check, for each service node SN1-SN5, a number of performance parameters indicative of the current operative conditions of the service node. In particular, the number of checked parameters for each service node SN1-SN5 may be indicative of one or more of the following: CPU utilization, memory utilization, number of active subscriber sessions, available bandwidth on each service node interface, presence of alarms. The controller C may check the service nodes SN1-SN5 by following a predefined order of service nodes or randomly. Preferably, the controller C performs the checks described above according to a management protocol such as the simple network management protocol (SNMP) or the network configuration protocol (NETCONF).

At step 202, preferably, the controller C compares each checked parameter to a predefined threshold indicative of a critical value of the queried parameter, i.e. a value above which the service node may experience critical conditions and malfunctioning during its normal operation and/or in case of a fault situation. The condition according to which at a service node all the checked parameters are below their corresponding thresholds will be referred to in the following as "the service node is stable". On the contrary, the condition according to which at the service node at least one of the checked parameters is above its corresponding threshold will be referred to in the following description by the expression "the service node is not stable". In this latter case, as it will be clearer from the following description, the controller C may take decisions about the possibility of re-distributing the subscriber sessions currently established at the considered service node among other service nodes.

For each parameter, the respective threshold may have the same value for all the service nodes SN1-SN5 or it may have different values according to the considered service node. In any case, the parameter thresholds for a service node are preferably determined by an operator, such as a system administrator, and are preferably based on resource constraints associated with the service node. The resource constraints may comprise one or more of: the CPU speed, the amount of memory, the bandwidth of interfaces.

At step 202 the controller C, on the basis of whether the current values of the performance parameters of each service node SN1-SN5 exceed the corresponding thresholds or not, preferably determines whether each service node SN1-SN5 is stable or not. Further, the controller C preferably compiles a list comprising the service nodes SN1-SN5 and, for each of them, one or more data related to its performance parameters. In particular, for each parameter, the one or more data indicate whether the actual value of the parameter exceeds the respective threshold. Moreover, the one or more data may comprise an information indicative of a difference between the current value of the performance parameter and the respective threshold. According to embodiments of the present invention, the list comprises, for each service node SN1-SN5, an identifier of the service node and one or more flags, each flag indicating whether a corresponding performance parameter exceeds the respective threshold.

The service nodes SN1-SN5 may be introduced in the list according to a predefined order or randomly.

The following steps 204-211 are preferably repeated for each service node SN1-SN5 within the list.

At step 203, the controller C preferably considers the first service node in the list. For simplicity, in FIG. 2, the service nodes have been indicated with the identifiers SNi, i=1, . . . , N, where N is the number of service nodes. In the exemplary situation of FIG. 1, N=5. It is assumed that the controller C starts considering the first service node SN1 and performs steps 204-211, then the controller C considers the second service node SN2 and repeats steps 204-211, and so on until the fifth service node SN5 is considered. However, the order according to which the service nodes SN1-SN5 are considered by the controller C may also be different.

At step 204, the controller C preferably checks whether the considered service node is stable. In particular, the controller C preferably retrieves from the list compiled at step 202 the data indicating whether the performance parameters of the considered service node exceed their corresponding thresholds.

Then, if the considered service node is stable, the controller C preferably considers the next service node within the list and repeats step 204, until the last service node of the list is considered (steps 205 and 206).

If, at step 204, the controller C determines that, on the basis of the data contained in the list, the considered service node is not stable (namely, that the current value of one or more performance parameters exceeds the corresponding one or more thresholds), the controller C preferably determines a minimum number of subscriber sessions that are to be moved from the considered service node in order to restore its stability. In particular, the controller C preferably determines the minimum amount of subscriber sessions to move from the considered service node in order to restore its stability as the amount of subscriber sessions whose removal from the considered service node would bring the actual value of each performance parameter exceeding its respective threshold below the corresponding threshold (in the following, this number will be referred to as "number of exceeding sessions") (step 207). Then, at step 207, the controller C preferably determines an actual amount of subscriber sessions to move from the considered service node. This actual amount may be equal to or greater than the number of exceeding sessions. Moving an actual amount of subscriber sessions greater than the number of exceeding sessions advantageously allows guaranteeing that the performance parameters of the considered service node, once the subscriber sessions will be actually moved to another service node, will not remain close to the thresholds. In this case, a guard margin is achieved for each critical parameter, which allows avoiding the risk of exceeding the threshold again as soon as the considered service node allocates new subscriber sessions or increments its CPU or memory usage. For instance, the actual amount of subscriber sessions to move may be an integer multiple of the number of exceeding sessions.

At step 208, the controller C preferably checks whether other service nodes are stable to re-establish the subscriber sessions that are to be moved from the considered unstable service node (namely, to re-establish the actual amount of subscriber sessions to move from the considered service node as determined at step 207). In case there is not any stable service node or there are not enough stable service nodes to allocate at least the number of exceeding subscriber session determined at step 207, the controller C preferably does not take any action (namely, it does not move any subscriber session from the considered unstable service node). It then considers the next service node within the list and repeats step 204, until the last service node of the list is considered (steps 205 and 206).

If, at step 208, the controller C finds out that there is at least one other service node which is stable to re-establish the subscriber sessions that are to be moved from the considered unstable service node, it preferably identifies the subscriber sessions to move from the considered service node. In particular, the controller C preferably identifies one or more access nodes from which the actual amount of subscriber sessions to move from the considered service node come from. More in particular, the controller C preferably identifies a minimum number of access nodes from which the subscriber sessions to be moved from the considered service node come from. The identification of this minimum number of access nodes is performed according to predetermined criteria which will be illustrated in more detail herein after with reference to some exemplary embodiments.

At step 209, the controller C preferably selects one or more service nodes among the at least one service node which is stable, in order to re-establish the subscriber sessions that are to be moved from the considered service node. If there are more than one stable service nodes than can be selected and each of them individually may allocate the subscriber sessions to be re-established, the controller C may select, among these stable service nodes, the one that is currently associated with the minimum number of active subscriber sessions. Moreover, if the controller C, at step 208, finds out that there are more than one stable service node, and more than one service node is required to re-establish the subscriber sessions that are to be moved from the considered service node (because none of the stable service nodes can individually allocate all of the subscriber sessions to be re-established), the controller C may select the required service nodes by considering the amount of currently active subscriber sessions in those service nodes, in ascending order. In this way, for instance, the one or more service nodes having the lowest amount of currently active subscriber session may be selected. Furthermore, the controller C, at step 208, may select a number of stable service nodes higher than one also in case only one stable service node would be sufficient to re-establish the subscriber sessions. In this case, the subscriber sessions to be re-established are divided among a plurality of stable service nodes instead of being allocated to a single stable service node. This allows implementing a load balancing scheme for more efficiently exploiting the network resources.

According to other embodiments, the controller C may determine that the actual number of subscriber sessions to move from the considered service node may also be a fraction of the number of exceeding sessions. This situation may be contemplated for instance in case at step 208 the controller C determines that there are not enough stable service nodes to move at least the number of exceeding subscriber sessions from the considered service node and re-establish them elsewhere. In this case, the controller C may determine to move a fraction of the number of exceeding subscriber sessions from the considered service node to one or more further service nodes in order to at least partially restore the stability of the considered service node.

At step 210, the controller C preferably re-configures the communication network CN to re-establish the subscriber sessions that are to be moved from the considered service node. In particular the controller C preferably re-configures the communication network CN to establish a connectivity between the one or more access nodes associated with the subscriber sessions to be moved from the considered service node, as identified at step 208, and the one or more stable service nodes identified at step 209. In particular, for each subscriber session, the controller C preferably changes the configuration of the network nodes, namely the access nodes AN1, AN2, the aggregation nodes AGN1, AGN2, and the service nodes SN1-SN5 comprised within the path between the access node associated with the subscriber session and the new service node on which the subscriber session is re-established. For instance, the controller C may change the association between a subscriber line at an ingress port of an access node and an egress port of the same access node, or it may change the transport VLAN in the aggregation network, or it may change other parameters on the interfaces of the nodes of the backbone network, etc. In order to re-configure the communication network, the controller C preferably uses a management protocol such as the simple network management protocol (SNMP) or the network configuration protocol (NETCONF).

Finally, the controller C preferably considers the next service node within the list and repeats steps 204 and possibly steps 207-211 (if the service node is not stable), until the last service node of the list is considered (steps 205 and 206).

Preferably, the controller C periodically performs the method of the present invention, namely steps 201-211. The period is preferably equal to few minutes, e.g. 5 minutes.

Figure 3:
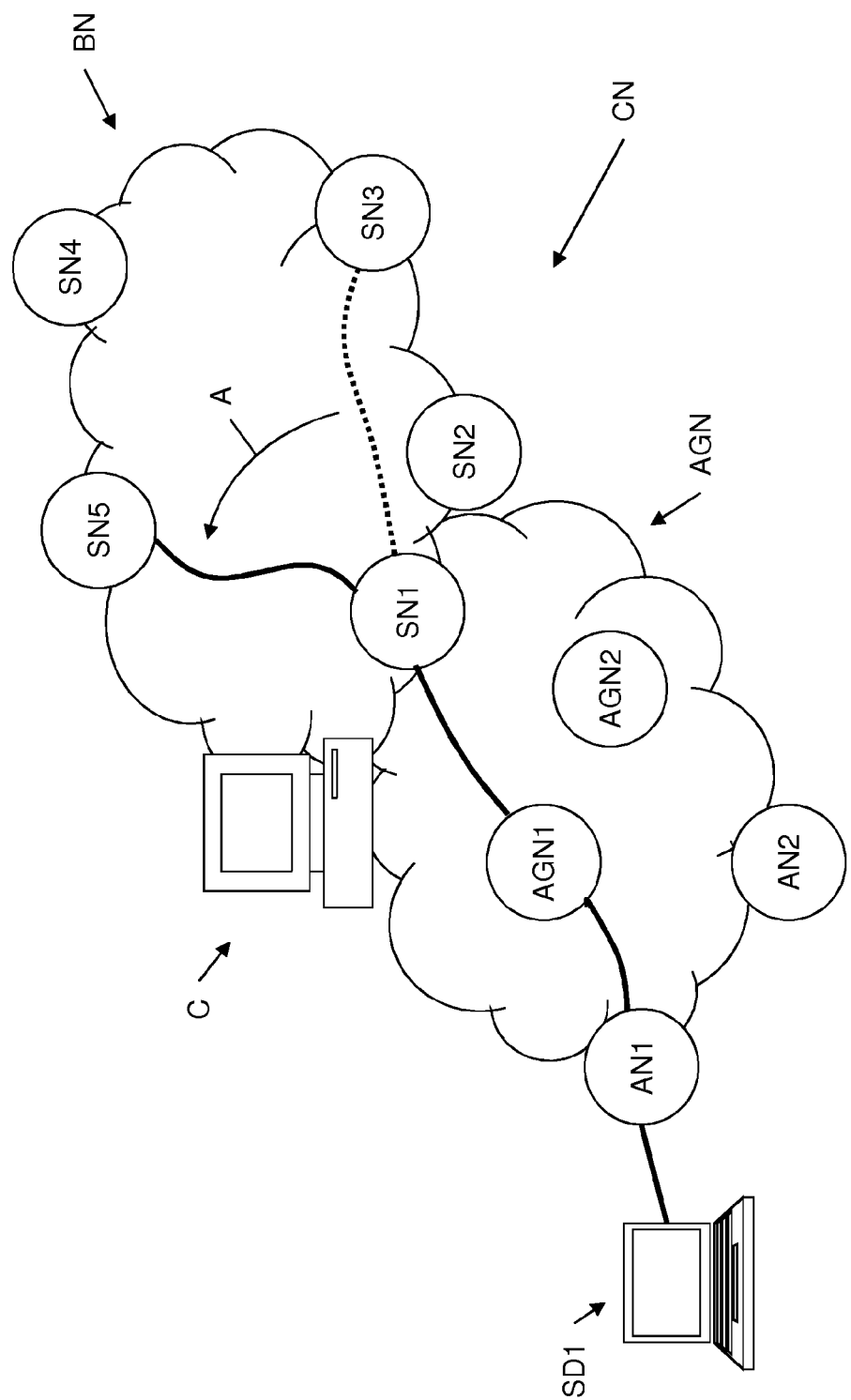
FIG. 3 schematically shows the communication network of FIG. 1 in an exemplary scenario of application of the method of the present invention

For sake of example, within the scenario depicted in FIG. 1, it is assumed that the third service node SN3 is overloaded. Therefore, at step 204, the controller C preferably determines that the third service node SN3 is not stable. In this case, at step 207, the controller C determines the number of active subscriber sessions to be moved from the third service node SN3. Then, the controller C may find out that the fifth service node SN5 is stable (step 208), and it may determine that the subscriber sessions to be moved from the third service node SN3, among which the first subscriber session represented in FIG. 1, may be re-established on the fifth service node SN5, as schematically represented by the arrow "A" in FIG. 3.

The method of the present invention advantageously allows to automatically prevent overloading conditions on a service node by dynamically changing the association between access nodes and service nodes of the communication network. The method is performed by a controller which periodically monitors the conditions of the service nodes in terms of its stability and changes the association between an access node and a service node when some predefined thresholds are crossed, by finding a new service node having available resources. Then, the method provides for automatically performing all the network configurations needed to create a path between the access node and the new service node and controlling the establishment of the subscriber session on the new service node. Such a method is useful both during the normal operation of the communication network, to control resource consumption and prevent overloads, and in case of fault conditions, to protect the subscriber sessions impacted by a failure by selecting a "backup" service node not affected by the failure to terminate them.

With reference to FIG. 2, a first exemplary embodiment of the present invention is described herein below.

At step 201 the controller C checks, at each service node, a parameter R indicative of a ratio between a number NS of active subscriber sessions and a maximum number $NS_{max}$ of subscriber sessions that the service node may maintain. A predefined threshold T for this parameter may be chosen as 80%. In this exemplary situation, if R is higher than T, the service node is not stable. According to this embodiment, at step 202 the controller C compiles a list comprising the identifiers of the service nodes and, for each service node, the respective current value of R. At step 204, the controller C preferably checks whether R is higher than the threshold T for the considered service node and, in the affirmative, it preferably determines the amount of active subscriber sessions established at the considered service node which exceeds the threshold, i.e. a number of subscriber sessions that are to be moved from the considered service node in order to restore stability (step 207). In case R>T, the number of exceeding subscriber sessions is $DS1=(R-T)\cdot NS_{max}$. Further at step 207, the controller C preferably decides the actual amount of subscriber sessions to move from the considered service node, as described above. It is assumed herein after, for sake of simplicity, that the controller decides that this number is equal to DS1.

If, at step 208, the controller C determines that there are stable service nodes to re-establish the number DS1 of subscriber sessions that are to be moved from the considered service node, the controller C preferably identifies a minimum number of access nodes such that the sum of the active subscriber sessions established between the considered service node and this minimum number of access nodes is greater than the number DS1 of subscriber sessions that are to be moved from the considered service node.

Then, at step 210 the controller C preferably selects one or more stable service nodes to re-establish the number DS1 of subscriber sessions that are to be moved from the considered service node. In particular, according to this embodiment, the controller C preferably selects, among the stable service nodes identified at step 208, the service node(s) having the lowest value of the parameter R. In case more than one service node is considered to re-establish the number DS1 of subscriber sessions (either because a single stable service node is not sufficient or for load balancing purposes), the controller C preferably selects the one or more service nodes according to an ascending order with respect to their value of parameter R.

According to a second exemplary embodiment of the present invention, at step 201 the controller C checks, at each service node, the following parameters:
- a first parameter R1 indicative of a ratio between the number of active subscriber sessions and a maximum number of subscriber sessions that the service node may maintain;
- a second parameter R2 indicative of a CPU utilization of the service node, and which may be expressed in a scale of 0 to 100; and
- a third parameter R3 indicative of a memory utilization of the service node, and which may be expressed in a scale of 0 to 100.

According to this second exemplary embodiment, the thresholds for the first parameter R1, for the second parameter R2 and for the third parameter R3 may have a same value, which may be e.g. equal to 80%. However, they may also have different values. In the following description, for sake of clarity, the thresholds for the first parameter R1, the second parameter R2 and the third parameter R3 will be indicated, respectively, as T1, T2, T3.

According to this further embodiment, at step 204, the controller C preferably checks whether each of the first parameter R1, the second parameter R2 and the third parameter R3 exceeds the respective threshold for the considered service node. The following scenarios may arise:
1) if R1≤T1, R2≤T2 and R3≤T3, then the controller C takes no action and considers the next service node within the list (steps 205 and 206);
2) if R1≤T1 and at least one of the second parameter R2 and the third parameter R3 is greater than its respective threshold T2, T3, the controller C preferably determines a number DS2 of exceeding subscriber sessions at least equal to a fraction of the currently active subscriber sessions (step 207). For instance, the number of exceeding subscriber sessions may be equal to 10% of the active subscriber sessions.
3) if R1>T1, R2≤T2 and R3≤T3, the controller C preferably determines a number DS1 of exceeding subscriber sessions as the quantity exceeding the threshold T1 (step 207), as already described above.
4) if R1>T1 and one of the second parameter R2 and the third parameter R3 is greater than its respective threshold T2, T3, the controller C preferably determines a number of exceeding subscriber sessions at least equal to DS1+DS2 (step 207).

In anyone of scenarios 2, 3 and 4 above, at step 208, the controller C preferably determines whether there are stable service nodes to re-establish the number of subscriber sessions that are to be moved from the considered service node (this number being at least equal to DS2 in scenario 2, at least equal to DS1 in scenario 3 and at least equal to DS1+DS2 in scenario 4). In the affirmative, the controller C preferably identifies a minimum number of access nodes such that the sum of the active subscriber sessions established between the considered service node and this minimum number of access nodes is greater than the number of subscriber sessions that are to be moved from the considered service node (step 209).

Then, at step 210 the controller C preferably selects one or more stable service nodes to re-establish the number of subscriber sessions that are to be moved from the considered service node. In particular, according to this embodiment, the controller C preferably selects, among the stable service nodes identified at step 208, the service node having the lowest value of the parameter R. In case more than one service node is considered to re-establish the number of subscriber sessions, the controller C preferably selects the one or more stable service nodes according to an ascending order of their parameter R1.

Furthermore, according to preferred embodiments of the present invention, the aggregation network AGN that interconnects the access nodes AN1, AN2 and the service nodes SN1-SN5 is a seamless MPLS network. The seamless MPLS architecture is currently described in the Internet-Draft "Seamless MPLS Architecture draft-ietf-mpls-seamless-mpls-07" of the MPLS Working Group of the Internet Engineering Task Force (IETF), Dec. 30, 2014.

According to these embodiments, the nodes (access nodes, aggregation nodes, service nodes) of the communication network CN are connected by a full mesh of label switched paths (LSPs) created by an MPLS control plane. A subscriber session between an access node and a service node is preferably carried by a pseudowire connecting the access node and the service node In this case, advantageously, the controller, at step 211 of the method of the present invention, shall not change the configuration of all the network nodes comprised within the path between the access node and the new service node. Indeed, the controller should configure a new pseudowire between the access node and the new service node, if a pseudowire does not already exist between them, by simply configuring the end points of the pseudowire, namely the access node and the new service node. If a pseudowire already exists, the controller simply changes the association, on the access node only, between a subscriber access port, on the access side, and the pseudowire on the network side to establish the subscriber session. Therefore, no changes to the configurations of the network nodes that lie between the end points of the pseudowire is needed. The skilled person will appreciate that these embodiments of the method of the present invention allow to dynamically changing the association between an access node and a service node for a subscriber session in an extremely simple and effective way.

The invention claimed is:

1. A method for re-distributing subscriber sessions originated from one or more access nodes of a communication network to a number of service nodes of the communication network, said method comprising:
   a) monitoring at least one performance parameter of said service nodes;
   b) for each of the service nodes, comparing a value of said at least one performance parameter with a threshold; and
   in case said value exceeds said threshold at a given service node,
   c) determining a first number of subscriber sessions to be moved from said given service node;
   d) selecting at least one further service node to re-establish said first number of subscriber sessions; and
   e) re-configuring said communication network to move said first number of subscriber sessions from said given service node to said at least one further service node.

2. The method according to claim 1, wherein said at least one performance parameter is indicative of one or more of the following: CPU utilization, memory utilization, number of active subscriber sessions, available bandwidth on each service node interface, presence of alarms.

3. The method according to claim 1, wherein said at least one performance parameter comprises, at least in part, a ratio, R, between a number, NS, of active subscriber sessions at the given service node and a maximum number of subscriber sessions, $NS_{max}$, that the given service node may maintain.

4. The method according to claim 1, wherein said at least one performance parameter comprises a first parameter that comprises a ratio between a number of active subscriber sessions at the given service node and a maximum number of subscriber sessions that the given service node may maintain, a second parameter indicative of a CPU utilization of the given service node and a third parameter indicative of a memory utilization of the given service node.

5. The method according to claim 1, wherein further comprising:
   compiling a list comprising said service nodes and, for each of them, one or more data related to said at least one performance parameter of the service node.

6. The method according to claim 1, wherein said first number of subscriber sessions to be moved from said given service node is equal to at least a second number of subscriber sessions whose removal from said given service node would bring said value of the at least one performance parameter exceeding said threshold below the corresponding threshold.

7. The method according to claim 6, wherein said first number of subscriber sessions to be moved from said given service node is greater than said second number of subscriber sessions.

8. The method according to claim 3, wherein said first number of subscriber sessions to be moved from said given service node is equal to or greater than $(R-T) \cdot NS_{max}$, T being the threshold.

9. The method according to claim 1, wherein it further comprises, before step d), identifying a minimum number of said access nodes from which said subscriber sessions to be moved from the given service node come from.

10. The method according to claim 9, wherein said minimum number of access nodes is selected such that a sum of active subscriber sessions established between the given service node and the minimum number of access nodes is greater than said first number of subscriber sessions to be moved from said given service node.

11. The method according to claim 1, wherein at step d) selecting at least one further service node comprises selecting a plurality of further service nodes.

12. The method according to claim 1, wherein said at least one further service node is selected as the further service node that is currently associated with a minimum number of active subscriber sessions.

13. The method according to claim 1, wherein said access nodes and said service nodes are interconnected through a seamless MPLS network.

14. A non-transitory computer-readable medium comprising computer-executable instructions for performing, when executed by a computer, the method according to claim 1.

15. An apparatus for re-distributing subscriber sessions originated from one or more access nodes of a communication network to a number of service nodes of the communication network, the apparatus comprising:
   circuitry, including at least a processor coupled to a memory, configured to
      monitor at least one performance parameter of said service nodes;

for each of the service nodes, compare a value of said at least one performance parameter with a threshold; and in case said value exceeds said threshold at a given service node, determine a first number of subscriber sessions to be moved from said given service node;

select at least one further service node to re-establish said first number of subscriber sessions; and re-configure said communication network to move said first number of subscriber sessions from said given service node to said at least one further service node.

* * * * *